US010854856B2

(12) United States Patent
Seong (10) Patent No.: US 10,854,856 B2
(45) Date of Patent: Dec. 1, 2020

(54) CURVED SECONDARY BATTERY

(71) Applicant: SAMSUNG SDI CO., LTD., Yongin-si (KR)

(72) Inventor: Jaeil Seong, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 1100 days.

(21) Appl. No.: 14/848,671

(22) Filed: Sep. 9, 2015

(65) Prior Publication Data

US 2016/0079571 A1    Mar. 17, 2016

(30) Foreign Application Priority Data

Sep. 16, 2014 (KR) .................. 10-2014-0122921

(51) Int. Cl.
*H01M 2/02* (2006.01)
*H01M 10/058* (2010.01)
*H01M 10/052* (2010.01)

(52) U.S. Cl.
CPC .......... *H01M 2/0202* (2013.01); *H01M 2/024* (2013.01); *H01M 10/052* (2013.01); *H01M 10/058* (2013.01); *H01M 2002/0205* (2013.01)

(58) Field of Classification Search
CPC .... H01M 2/0202; H01M 2/0404; H01M 2/02; H01M 2/08; H01M 2002/0205; H01M 2/30; Y10T 29/4911
USPC ........................................................ 429/185
See application file for complete search history.

(56) References Cited

U.S. PATENT DOCUMENTS

| 7,960,055 B2* | 6/2011 | Uh ...................... H01M 2/0404 29/623.1 |
| 9,812,673 B2* | 11/2017 | Seong ................ H01M 2/0202 |
| 2003/0017390 A1 | 1/2003 | Probst et al. |
| 2009/0305128 A1* | 12/2009 | Yeo ..................... H01M 2/0202 429/174 |
| 2015/0140371 A1* | 5/2015 | Slocum .................. H01M 2/02 429/56 |
| 2015/0140416 A1* | 5/2015 | Seong ................ H01M 8/1067 429/179 |

FOREIGN PATENT DOCUMENTS

| JP | 06181069 A | * | 6/1994 |
| KR | 10-2000-0061589 A | | 10/2000 |
| KR | 10-2003-0084153 A | | 11/2003 |
| KR | 10-2005-0015006 A | | 2/2005 |

(Continued)

OTHER PUBLICATIONS

English translation of Yoshida, JP 06181069 A, Jun. 1994, Japan.*

(Continued)

*Primary Examiner* — Cynthia H Kelly
*Assistant Examiner* — Monique M Wills
(74) *Attorney, Agent, or Firm* — Lee IP Law, P.C.

(57) ABSTRACT

A curved secondary battery includes an electrode assembly including a first electrode plate, a second electrode plate, and a separator between the first and second electrode plates, a can accommodating the electrode assembly, the can being curved and portions of the can having different thicknesses in a bending direction of the can, the can having an opening in a side thereof that provide a passage for the electrode assembly, and a cap plate sealing the opening of the can.

16 Claims, 4 Drawing Sheets

(56) References Cited

FOREIGN PATENT DOCUMENTS

KR    2006 0111834 A    10/2006
KR    2009 0127704 A    12/2009

OTHER PUBLICATIONS https://www.minifaber.com/blog/the-art-of-sheet-metal-bending accessed Mar. 24, 2018.*
http://thelibraryofmanufacturing.com/sheetmetal_bending.html accessed Mar. 24, 2018.*
Korean Office action dated Jul. 13, 2020.

* cited by examiner

CURVED SECONDARY BATTERY

CROSS-REFERENCE TO RELATED APPLICATION

Korean Patent Application No. 10-2014-0122921, filed on Sep. 16, 2014, in the Korean Intellectual Property Office, and entitled: "Curved Secondary Battery," is incorporated by reference herein in its entirety.

BACKGROUND

1. Field

Embodiments relate to a curved secondary battery.

2. Description of the Related Art

Secondary batteries are chargeable and dischargeable batteries that are widely used in small mobile devices such as smartphones, ultra-slim laptop computers, tablet personal computers, personal digital assistants, camcorders, and digital cameras, or medium and large devices such as electric vehicles, hybrid electric vehicles, electric bicycles, uninterruptible power supplies (UPSs), and energy storage systems (ESSs).

SUMMARY

Embodiments are directed to a curved secondary battery, including an electrode assembly including a first electrode plate, a second electrode plate, and a separator between the first and second electrode plates, a can accommodating the electrode assembly, the can being curved and portions of the can having different thicknesses in a bending direction of the can, the can having an opening in a side thereof that provide a passage for the electrode assembly, and a cap plate sealing the opening of the can.

The can may include a first side having a first thickness, a second side facing the first side and having a second thickness, third sides forming lateral sides connecting the first and second sides, and a fourth side that is opposite the opening and forming a bottom side connecting the first side, the second side, and the third sides. The first and second sides may have curvatures corresponding to each other and are bent in one direction, and the first thickness of the first side may be different from the second thickness of the second side.

The first side may form a concave surface of the can, the second side may form a convex surface of the can, and the first thickness of the first side may be greater than the second thickness of the second side.

The first thickness of the first side may be 1.1 or more times the second thickness of the second side.

The first and second sides may be disposed in a direction perpendicular to a direction in which the cap plate is disposed.

The first and second sides may stand upright from long side edges of the fourth side, respectively.

The third sides may form lateral sides connecting edges of the first side to edges of the second side facing the first side.

The third sides may increase in thickness from the edges of the second side to the edges of the first side.

First parts of the third sides adjoining the edges of the first side may have the same thickness as the first thickness of the first side.

Second parts of the third sides adjoining the edges of the second side may have the same thickness as the second thickness of the second side.

First parts of the third sides adjoining the edges of the first side may be thickest parts of the third sides, and second parts of the third sides adjoining the edges of the second side may be thinnest parts of the third sides.

Each of the third sides may have a positive curvature toward an outside of the can.

The first side, the second side, the third sides, and the fourth side may be continuously connected and form an inner space in which the electrode assembly is accommodated.

The first side may be located inside in the bending direction of the can, the second side may be located outside in the bending direction of the can, the first thickness of the first side may be greater than the second thickness of the second side, and the third sides may have a uniform thickness that is greater than the second thickness.

The thickness of the third sides may be uniformly the same as the first thickness.

The can may be a hollow rectangular parallelepiped in which the opening communicates with the inner space.

The can may include a metallic material.

An insulation plate and a terminal plate may be disposed between the cap plate and the can, and an electrode pin may be connected to the terminal plate through the cap plate insulated by a gasket and the insulation plate.

A first electrode tab may be electrically connected to the first electrode plate, a second electrode tab may be electrically connected to the second electrode plate, the can and the cap plate may be in contact with each other and are welded together, the first electrode tab may be electrically connected to the cap plate, and the second electrode tab may be electrically connected to the terminal plate.

An anchor may protrude from the cap plate toward the insulation plate, and an anchor cut may be formed in the insulation plate to receive the anchor.

BRIEF DESCRIPTION OF THE DRAWINGS

Features will become apparent to those of skill in the art by describing in detail example embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art.

In the drawing figures, the dimensions of layers and regions may be exaggerated for clarity of illustration. Like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list.

It will be understood that although the terms "first" and "second" are used herein to describe various elements, these elements should not be limited by these terms. Terms are only used to distinguish one element from other elements.

In the following description, the technical terms are used only for explaining a specific example embodiment while not limiting the inventive concept. The meaning of 'include' or 'comprise' specifies a property, a fixed number, a step, a process, an element, a component, and a combination thereof but does not exclude other properties, fixed numbers, steps, processes, elements, components, and combinations thereof.

Figure 1:
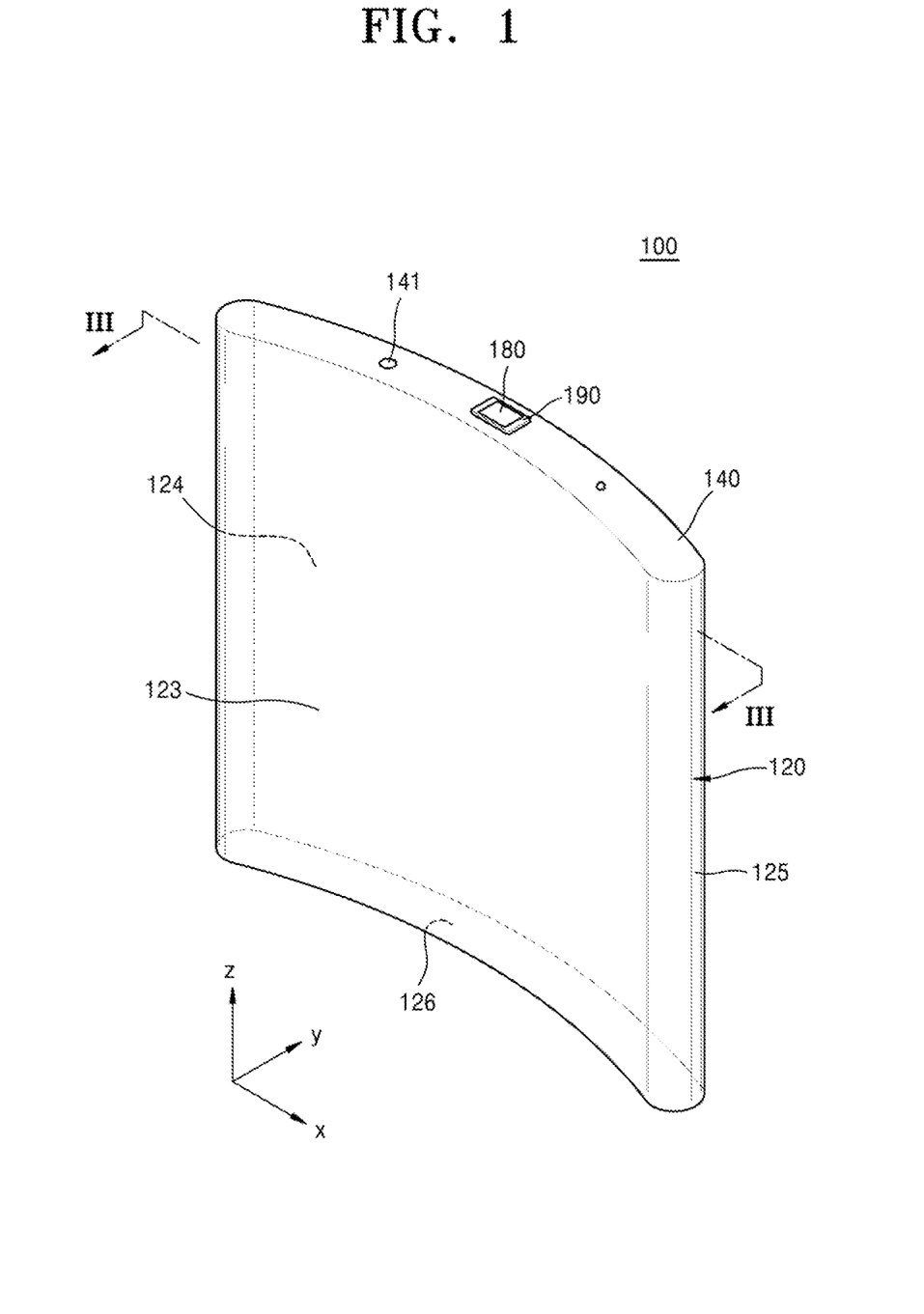
FIG. 1 illustrates a perspective view of a curved secondary battery according to an example embodiment.
Figure 2:
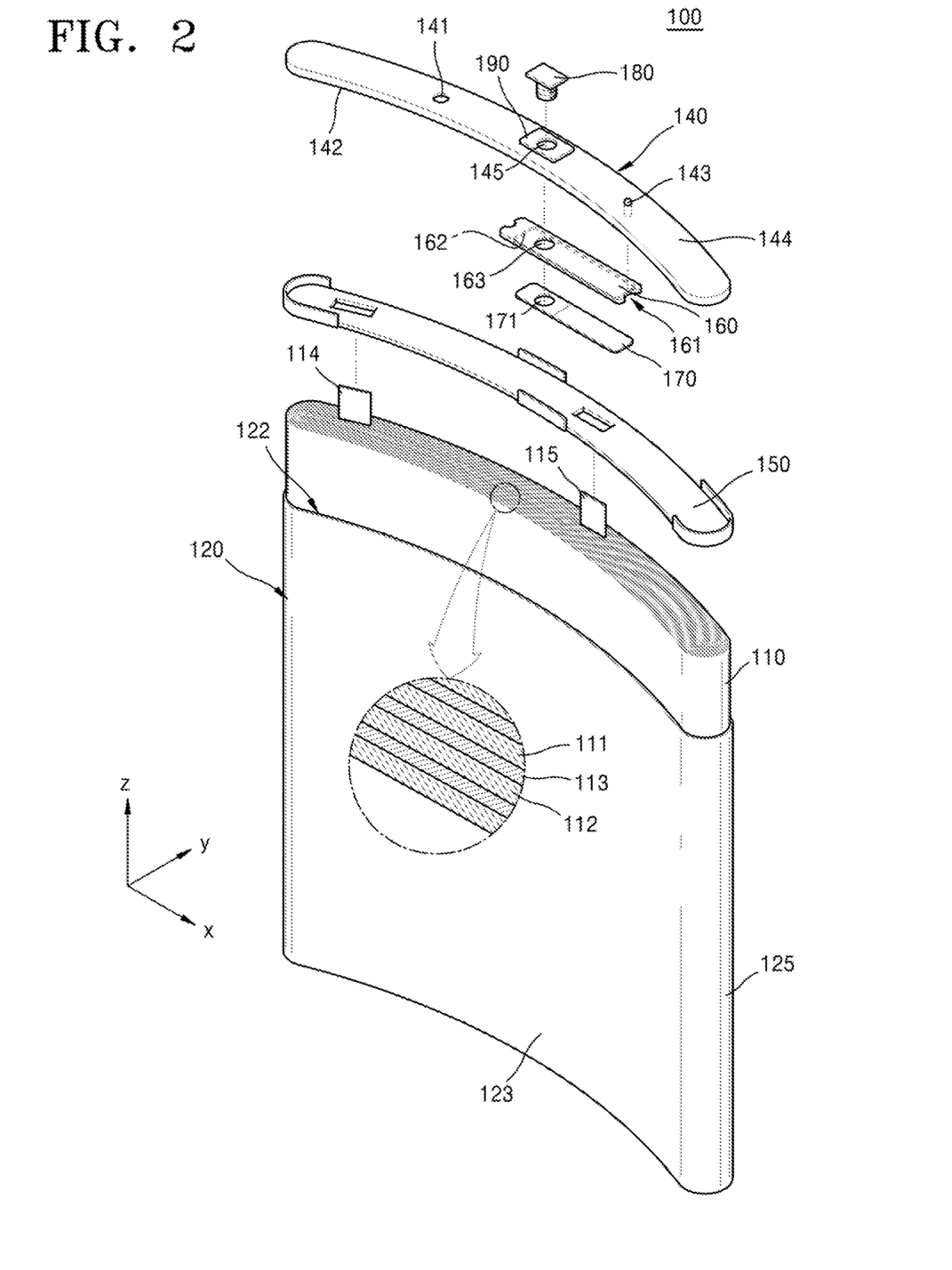
FIG. 2 illustrates an exploded perspective view of the curved secondary battery of FIG. 1 after cutting away a part of the curved secondary battery and disassembling the secondary battery.
Figure 3:
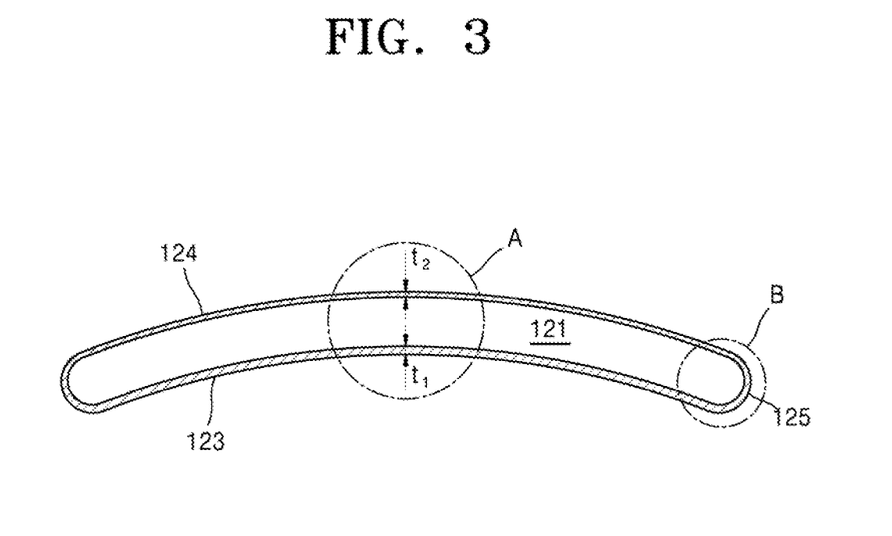
FIG. 3 illustrates a cross-sectional view taken along line III-III of FIG. 1, which shows a can.
Figure 4:
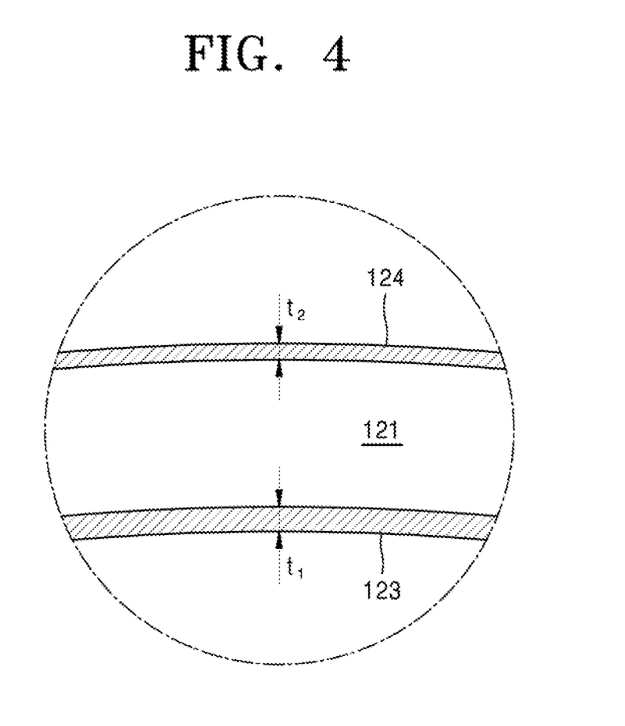
FIG. 4 illustrates an enlarged view of a portion A of the can illustrated in FIG. 3.
Figure 5:
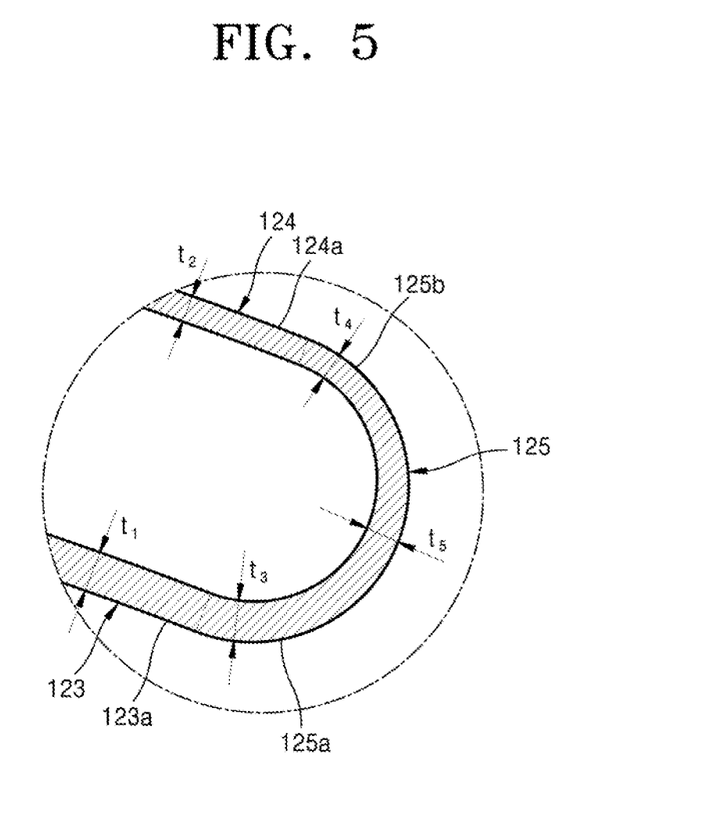
FIG. 5 illustrates an enlarged view of a portion B of the can illustrated in FIG. 3.

FIG. 1 is a perspective view illustrating a curved secondary battery 100 according to an example embodiment, and FIG. 2 is an exploded perspective view illustrating the curved secondary battery 100 of FIG. 1 after cutting away a part of the curved secondary battery 100 and disassembling the curved secondary battery 100. FIG. 3 is a cross-sectional view taken along line III-III of FIG. 1, which shows a can 120. FIG. 4 is an enlarged view of a portion A of the can 120 illustrated in FIG. 3, and FIG. 5 is an enlarged view of a portion B of the can 120 illustrated in FIG. 3.

In the example embodiment shown in FIGS. 1 to 5, the curved secondary battery 100 includes an electrode assembly 110, the can 120 accommodating the electrode assembly 110, and a cap plate 140 sealing the can 120.

The electrode assembly 110 may include a first electrode plate 111, a second electrode plate 112, and a separator 113 disposed between the first electrode plate 111 and the second electrode plate 112. The electrode assembly 110 may be a jelly-roll-type electrode assembly formed by sequentially stacking and winding the first electrode plate 111, the separator 113, and the second electrode plate 112 in one direction.

In an example embodiment, the electrode assembly 110 may be a stack-type electrode assembly formed by sequentially stacking the first electrode plate 111, the separator 113, and the second electrode plate 112, or may be a stack and folding-type electrode assembly formed by winding bi-cells each formed by stacking the first electrode plate 111, the separator 113, and the second electrode plate 112. The electrode assembly 110 may be implemented in various types.

The first electrode plate 111 may be one of a positive electrode plate or a negative electrode plate. If the first electrode plate 111 is a positive electrode plate, the second electrode plate 112 may be a negative electrode plate, and if the first electrode plate 111 is a negative electrode plate, the second electrode plate 112 may be a positive electrode plate. The first electrode plate 111 and the second electrode plate 112 have different polarities. For convenience only, it is assumed that the first electrode plate 111 is a positive electrode plate, and the second electrode plate 112 is a negative electrode plate.

The first electrode plate 111 may include a first electrode active material portion that is coated with a first electrode active material, and a first electrode non-coating portion that is not coated with the first electrode active material. For example, the first electrode active material portion may be formed by applying the first electrode active material to a portion of at least one side of a first metal plate, and the first electrode non-coating portion may be the other portion of the first metal plate that is not coated with the first electrode active material. The first metal plate may include, for example, an aluminum plate. The first electrode active material may include, for example, a lithium-containing transition metal oxide such as $LiCoO_2$, $LiNiO_2$, $LiMnO_2$, or $LiMnO_4$, or a lithium chalcogenide.

A first electrode tab 114 may be electrically connected to the first electrode plate 111. The first electrode tab 114 may be electrically connected to the first electrode non-coating portion by welding. In another implementation, the first electrode tab 114 may be formed in one piece with the first electrode non-coating portion and may extend from the first electrode non-coating portion.

The second electrode plate 112 may include a second electrode active material portion that is coated with a second electrode active material, and a second electrode non-coating portion that is not coated with the second electrode active material. For example, the second electrode active material portion may be formed by applying the second electrode active material to a portion of at least one side of a second metal plate, and the second electrode non-coating portion may be the other portion of the second metal plate that is not coated with the second electrode active material. The second metal plate may include, for example, a copper plate. The second electrode active material may include, for example, a carbon material such as crystalline carbon, amorphous carbon, a carbon composite, or carbon fiber, a lithium metal, or a lithium alloy.

A second electrode tab 115 may be electrically connected to the second electrode plate 112. The second electrode tab 115 may be electrically connected to the second electrode non-coating portion, for example, by welding. In another implementation, the second electrode tab 115 may be formed in one piece with the second electrode non-coating portion and may extend from the second electrode non-coating portion.

Both of the first electrode tab 114 and the second electrode tab 115 may be disposed on inner layers of the electrode assembly 110 having a jelly-roll-type. In another implementation, one of the first electrode tab 114 and the second electrode tab 115 may be disposed on an inner layer of the electrode assembly 110, and the other of the first electrode tab 114 and the second electrode tab 115 may be disposed on an outer layer of the electrode assembly 110.

The separator 113 may be, for example, a porous polymer film such as a polyethylene film or a polypropylene film. The separator 113 may be, for example, woven fabric or non-woven fabric including polymer fabric. The separator 130 may include ceramic particles. The separator 113 may be formed of solid polymer electrolyte.

The separator 113 may be an independent film, or may be a non-conductive porous layer formed on the first electrode plate 111 or the second electrode plate 112. The separator 113 electrically separates the first electrode plate 111 and the second electrode plate 112 from each other. However, the separator 113 may not have the same shape as the shape of the first electrode plate 111 or the second electrode plate 112.

The can 120 may have a predetermined curvature. The can 120 includes an inner space 121 to accommodate the electrode assembly 110. An opening 122 is formed in a side of the can 120 so that the electrode assembly 110 may be inserted into the can 120 through the opening 122.

The can 120 may be formed of a metallic material. For example, the can 120 may be formed of aluminum or an aluminum alloy. The can 120 may protect the electrode assembly 110 from impact, and during charging and discharging operations of the electrode assembly 110, the can 120 may function as a heat-dissipation plate to dissipate heat from the electrode assembly 110 to the outside.

In another implementation, the curved secondary battery 100, including the can 120, may be a curved secondary battery that is flexible in at least one direction.

The cap plate 140 may seal the opening 122 of the can 120. Like the can 120, the cap plate 140 may be formed of a metallic material such as aluminum or an aluminum alloy. Contact portions of the cap plate 140 and the can 120 may be joined by a method such as a laser welding method.

The cap plate 140 may be disposed on an insulation case 150 and may be coupled to the can 120 having the opening 122 for sealing the can 120.

The cap plate 140 may include an electrolyte inlet 141. After the cap plate 140 is coupled to the can 120, electrolyte may be filled in the can 120 through the electrolyte inlet 141. After the electrolyte is completely filled, the electrolyte inlet 141 may be closed.

An insulation plate 160 and a terminal plate 170 may be disposed between the can 120 and the cap plate 140 in an up-to-down direction of the curved secondary battery 100.

The insulation plate 160 may be formed of an insulation material and may prevent a short circuit between the cap plate 140 and the terminal plate 170.

An anchor 143 may protrude from a first surface 142 of the cap plate 140 facing the insulation plate 160 toward the insulation plate 160. An anchor cut 161 may be formed in a lateral edge of the insulation plate 160 to receive the anchor 143. After the anchor 143 is placed in the anchor cut 161, the insulation plate 160 may not be twisted.

The size of the anchor cut 161 may be greater than the anchor 143. For example, the anchor cut 161 may extend in a direction in which the curved secondary battery 100 bends.

The terminal plate 170 may be disposed in a mount recess 162 formed in the insulation plate 160. The terminal plate 170 may be formed of a nickel alloy. The second electrode tab 115 may be electrically connected to a portion of the terminal plate 170.

An electrode pin 180 may be disposed on a second surface 144 of the cap plate 140 that is opposite the first surface 142. The electrode pin 180 may be inserted in terminal penetration holes 145, 163, and 171 respectively formed in the cap plate 140, the insulation plate 160, and the terminal plate 170, and then the electrode pin 180 may be connected to the terminal plate 170. Since the terminal plate 170 is connected to the second electrode tab 115 of the electrode assembly 110, the electrode pin 180 may be electrically connected to the second electrode plate 112.

The first electrode tab 114 may be electrically connected to the cap plate 140.

A gasket 190 may be disposed around the terminal penetration hole 145 of the cap plate 140. The gasket 190 may be formed of the same insulation material as that used to form the insulation plate 160. The cap plate 140 and the electrode pin 180 may be insulated from each other owing to the gasket 190.

In an implementation, the secondary battery may first be formed in a flat shape, and then the secondary battery may be placed on a jig having a predetermined curvature and pressed to bend the can 120 and form the curved secondary battery 100 having a curve in one direction. When the curved secondary battery 100 is manufactured by pressing the curved secondary battery 100, although the anchor 143 may be moved relative to the insulation plate 160 in a direction in which the curved secondary battery 100 is bent, the coupling between the anchor 143 and the anchor cut 161 may be maintained.

In another implementation, the can 120 may first be formed to have a curve in one direction, i.e., without bending an initially-formed unbent can.

When or after the curved secondary battery 100 is manufactured, if the electrode assembly 110 swells or the inside pressure of the curved secondary battery 100 increases, the can 120 may be deformed. According to example embodiments, the thickness of the can 120 varies in a bending direction of the curved secondary battery 100 so as to minimize the deformation of the can 120.

The can 120 includes a first side 123, a second side 124 facing the first side 123, third sides 125 connected to the first side 123 and the second side 124, and a fourth side 126 that is opposite the opening 122 and connected to the first side 123, the second side 124, and the third sides 125.

The first side 123 and the second side 124 are separate from each other in a y-axis direction, as shown in FIG. 1. The third sides 125 may be connected to both edges of the first side 123 in a width direction (x-axis direction in FIG. 1) and both edges of the second side 124 in the width direction (x-axis direction in FIG. 1). The third sides 125 are lateral sides connecting the first side 123 corresponding to the front side of the curved secondary battery 100 to the second side 124 corresponding to the rear side of the curved secondary battery 100.

Each of the first side 123 and the second side 124 has a rectangular shape. The first side 123 and the second side 124 may be disposed in a direction perpendicular to a direction in which the cap plate 140 is disposed.

The fourth side 126 may be connected to lower edges of the first side 123 and the second side 124. The fourth side 126 corresponds to the bottom side of the curved secondary battery 100. The first side 123 and the second side 124 may stand upright from both long side edges of the fourth side 126, respectively. The third sides 125 may stand upright from both short side edges of the fourth side 126, respectively.

The first side 123, the second side 124, the third sides 125, and the fourth side 126 may be continuously connected to form the inner space 121 in which the electrode assembly 110 inserted through the opening 122 is accommodated.

The structure of the can 120 may be implemented in various ways that allow the electrode assembly 110 may be accommodated in the can 120. For example, the can 120 may have a hollow rectangular parallelepiped structure in which the inner space 121 communicates with the opening 122.

The curved secondary battery 100 may have a predetermined curvature. For example, the first side 123 and the second side 124 may be formed with the shape of a curve or may be formed by bending in one direction to have curvatures corresponding to each other.

The first side 123 may be located inside and the second side 124 may be located outside in a direction in which the can 120 is bent. In the case of using a jig to bend the can 120, the first side 123 is deformed to form a concave surface of the can 120 and is subjected to compression, and the second side 124 is deformed to form a convex surface of the can 120 and is subjected to tension.

If the can 120 expands because of swelling or internal pressure of the electrode assembly 110, the first side 123 may be considerably deformed. To suppress the expansion of the can 120 in the thickness direction thereof, the first side 123 and the second side 124 may have different thicknesses (a first thickness $t_1$ and a second thickness $t_2$).

For example, the first thickness $t_1$ of the first side 123 may be greater than the second thickness $t_2$ of the second side

124. In an example embodiment, the first thickness $t_1$ of the first side 123 may be 1.1 or more times the second thickness $t_2$ of the second side 124, which may help suppress the expansion of the can 120 in the thickness direction thereof. If the first thickness $t_1$ of the first side 123 is less than 1.1 times the second thickness $t_2$ of the second side 124, the effect of suppressing the expansion of the can 120 in the thickness direction thereof may be insignificant.

In addition, the thicknesses of other portions of the can 120 may vary to increase the effect of suppressing the expansion of the can 120 in the thickness direction thereof.

In an example embodiment, the first thickness $t_1$ of the first side 123 and the third sides 125 may each have the first thickness $t_1$ so as to have a thickness that is greater than the second thickness $t_2$ of the second side 124. In an example embodiment, the first thickness $t_1$ of the first side 123 and the third sides 125 may be 1.1 or more times the second thickness $t_2$ of the second side 124.

In another example embodiment, the third sides 125 forming lateral surfaces of the can 120 may become thicker as they extend from edges of the second side 124 to edges of the first side 123.

For example, the thickness $t_3$ of a first part 125a of each of the third sides 125 adjoining an edge 123a of the first side 123 may be substantially the same as the first thickness $t_1$ of the first side 123. The thickness $t_4$ of a second part 125b of each of the third sides 125 adjoining an edge 124a of the second side 124 may be substantially the same as the second thickness $t_2$ of the second side 124. The thickness $t_3$ of the first part 125a of each of the third sides 125 adjoining the edge 123a of the first side 123 is the greatest thickness of each of the third sides 125, and the thickness $t_4$ of the second part 125b of each of the third sides 125 adjoining the edge 124a of the second side 124 is the smallest thickness of each of the third sides 125.

In an implementation, the thickness $t_5$ of each of the third sides 125 may gradually increase from the second part 125b to the first part 125a.

In an implementation, the thickness of the third sides 125 connecting the first side 123 and the second side 124 may vary, which may strengthen the third sides 125. Thus, thickness-wise expansion of the can 120 that is caused by swelling or internal pressure of the electrode assembly 110 may be suppressed by the first side 123, the second side 124, and the third sides 125 having different thicknesses.

The third sides 125 may have positive curvature toward the outside of the can 120.

As described above, embodiments relate to curved secondary batteries. Secondary batteries may be manufactured to have various shapes according to the structures of electric/electronic devices. For example, secondary batteries may have curves surfaces. Such curved secondary batteries should provide for safety. According to embodiments, deformation of the can of the curved secondary battery may be suppressed.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A curved secondary battery, comprising:
    an electrode assembly including a first electrode plate, a second electrode plate, and a separator between the first and second electrode plates;
    a can accommodating the electrode assembly, the can being curved, the can having an opening in a side thereof that provides a passage for the electrode assembly; and
    a cap plate sealing the opening of the can,
    wherein the can includes:
    a first side having a first thickness;
    a second side facing the first side and having a second thickness;
    third sides forming lateral sides connecting the first and second sides; and
    a fourth side that is opposite the opening and forming a bottom side connecting the first side, the second side, and the third sides,
    wherein the first and second sides have curvatures corresponding to each other and are curved in a same curving direction,
    wherein the first side forms a concave surface of the can and the second side forms a convex surface of the can, and
    wherein the first thickness is 1.1 or more times as thick as the second thickness.

2. The curved secondary battery as claimed in claim 1, wherein the first and second sides are disposed in a direction perpendicular to a direction in which the cap plate is disposed.

3. The curved secondary battery as claimed in claim 1, wherein the first and second sides stand upright from long side edges of the fourth side, respectively.

4. The curved secondary battery as claimed in claim 1, wherein the third sides form lateral sides connecting edges of the first side to edges of the second side facing the first side.

5. The curved secondary battery as claimed in claim 4, wherein the third sides increase in thickness from the edges of the second side to the edges of the first side.

6. The curved secondary battery as claimed in claim 5, wherein first parts of the third sides adjoining the edges of the first side have the same thickness as the first thickness of the first side.

7. The curved secondary battery as claimed in claim 5, wherein second parts of the third sides adjoining the edges of the second side have the same thickness as the second thickness of the second side.

8. The curved secondary battery as claimed in claim 5, wherein:
    first parts of the third sides adjoining the edges of the first side are thickest parts of the third sides, and
    second parts of the third sides adjoining the edges of the second side are thinnest parts of the third sides.

9. The curved secondary battery as claimed in claim 5, wherein each of the third sides forms a convex surface of the can.

10. The curved secondary battery as claimed in claim 1, wherein the first side, the second side, the third sides, and the fourth side are continuously connected and form an inner space in which the electrode assembly is accommodated.

11. The curved secondary battery as claimed in claim 1, wherein:

the third sides have a uniform thickness that is greater than the second thickness.

12. The curved secondary battery as claimed in claim 11, wherein the thickness of the third sides is uniformly the same as the first thickness.

13. The curved secondary battery as claimed in claim 1, wherein the can includes a metallic material.

14. The curved secondary battery as claimed in claim 1, wherein:
   an insulation plate and a terminal plate are disposed between the cap plate and the can, and
   an electrode pin is connected to the terminal plate through the cap plate insulated by a gasket and the insulation plate.

15. The curved secondary battery as claimed in claim 14, wherein:
   a first electrode tab is electrically connected to the first electrode plate,
   a second electrode tab is electrically connected to the second electrode plate,
   the can and the cap plate are in contact with each other and are welded together,
   the first electrode tab is electrically connected to the cap plate, and
   the second electrode tab is electrically connected to the terminal plate.

16. The curved secondary battery as claimed in claim 14, wherein:
   an anchor protrudes from the cap plate toward the insulation plate, and
   an anchor cut is formed in the insulation plate to receive the anchor.

* * * * *